United States Patent Office 3,576,788
Patented Apr. 27, 1971

3,576,788
POLYMERIC COMPOSITIONS PREPARED BY REACTING ARALKYL ETHERS WITH PHENOLS AND CURING SAID COMPOSITIONS WITH HEXAMETHYLENETETRAMINE
Glyn Islwyn Harris and Frederick Coxon, Glamorgan, Wales, assignors to Midland Silicones Limited, Reading, England
No Drawing. Filed July 19, 1967, Ser. No. 654,357
Claims priority, application Great Britain, July 27, 1966, 33,831/66
Int. Cl. C07c 43/02; C08g 33/10
U.S. Cl. 260—52
18 Claims

ABSTRACT OF THE DISCLOSURE

Polymer compositions are prepared by reacting an aralkyl ether or an aralkyl halide with a molar excess of a phenolic compound, preferably in the presence of a Friedel-Crafts catalyst. The polymer compositions may be cross-linked by reaction with a hardening agent for novolac resins, for example, hexamethylene tetramine, and are useful in the preparation of moulding compounds, laminates and solid lubricants.

This invention relates to the preparation of polymeric materials which are derived from phenolic compounds.

Novolac resins, which are now very well known materials, may be prepared by the reaction of a phenolic compound, for example, p-cresol, with formaldehyde in the presence of an acid catalyst. Such materials are usually provided in the form of powders which are convertible to the thermoset or intractable state by further reaction with a basic compound such as hexamethylene tetramine. It is also known that compounds containing aromatic nuclei for example benzyl chloride, diphenyloxide and anthracene may be cross-linked by means of aralkyl halides to form intractable cross-linked polymers.

We have now found that polymeric materials which may be cross-linked in the presence of a novolac resin hardening agent, for example hexamethylene tetramine, to a modified novolac-type resin may be prepared by the reaction of a phenolic compound and an aralkyl ether or an aralkyl halide.

Accordingly the present invention provides a process for the preparation of polymers which comprises reacting (1) an aralkyl ether of the general formula

R'[—(CH₂OR)]ₐ and/or an aralkyl halide of the general formula

R"[—(CH₂X)]ₐ wherein R' is a divalent or trivalent aromatic hydrocarbon or hydrocarbonoxy radical, R" is a divalent or trivalent aromatic hydrocarbon radical, R' and R" optionally containing inert substituents in the aromatic nucleus, R is an alkyl radical containing less than 6 carbon atoms, X is chlorine, bromine or iodine and a has a value of 2 or 3, with a molar excess of (2) a phenolic compound or a phenolic compound and a compound containing aromatic nuclei.

The term "phenolic compound" as employed herein includes any compound or mixture of compounds derived from benzene and containing from one to three, preferably one or two, hydroxyl radicals attached to the aromatic nucleus, there being a total of not more than three substituents attached to carbon atoms in the benzene nucleus. Examples of phenolic compounds for use in the process of this invention include phenol, p-cresol, resorcinol, catechol, isopropyl catechol, diphenylolpropane, diphenylolmethane, alkyl phenols such as p-ethylphenol, p-tert-butylphenol and p-tert-octyl phenol, p-phenylphenol, m-phenylphenol, p-aminophenol, pyrogallol and phloroglucinol. When the resinous reaction product is intended for laminating or moulding applications p-phenylphenol, diphenylolpropane and phenol are, in general, preferred.

According to the invention the phenolic compound is reacted with an aralkyl ether of the formula

R'[—(CH₂OR)]ₐ or an aralkyl halide of the general formula

R"[—(CH₂X)]ₐ

In these general formulae R' may represent any divalent or trivalent aromatic hydrocarbon or hydrocarbonoxy radical, for example the phenylene radical, the diphenylene radical, the diphenylene oxide radical

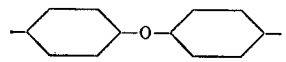

the radical

or the radical

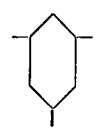

The R" radical present in the aralkyl halide may be any divalent or trivalent aromatic hydrocarbon radical, for example the phenylene radical, the diphenylene radical or the radical

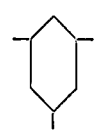

The radical R may be any alkyl radical containing less than six and preferably less than 4 carbon atoms and X represents a chlorine, bromine or iodine atom. The preferred compounds (1) for reaction with the phenolic compounds are those in which a has a value of 2, particularly the p-xylylene dihalides, for example p-xylylene dichloride, and the p-xylylene dialkyl ethers for example p-xylyleneglycoldimethylether.

If desired the R' and R" radicals may contain substituents for example methyl radicals attached to the aromatic nucleus provided the said substituents are inert under the conditions of the reaction. In fact, the presence of chlorine or fluorine atoms in some or all of the available positions in the aromatic nucleus has been found advantageous in that it leads to improved flame resistance in the resulting polymeric products. Examples of substituted aralkyl ethers and aralkyl halides which may be employed according to this invention are 2,3,5,6-tetrachloro-1,4-di-(methoxymethyl)-benzene.

The reaction between the phenolic compound and the aralkyl ether or aralkyl halide involves condensation of the alkoxy or halo groups in the aralkyl compound with nuclear hydrogen atoms in the phenolic compound with the elimination of an alcohol or a hydrogen halide. Preferably the process of an invention is carried out in the presence of a catalyst for this reaction for example certain ball clays or a Friedel-Crafts type catalyst such as stannic chloride, zinc chloride or ferric chloride. The most preferred catalyst is stannic chloride.

The quantity of catalyst employed is not critical and from about 0.01 to about 1 percent by weight based on the weight of the reactants (1) and (2) has been found to be sufficient for most purposes although up to 3 percent or more may be used if desired. In order to obtain reasonably short reaction times the reactants are preferably heated to temperatures in the range from about 150 to 200° C.

If desired organic solvents may be added to the reaction mixture for example to compatibilise the reaction components or assist in the recovery of the reaction product. Such organic solvents, if present, should preferably comprise the high boiling chlorinated aromatic compounds, with de-activated aromatic rings, for example chlorobenzene.

The time required for the reaction will depend upon such variables as the nature of the reactants, the type and quantity of the catalyst and the reaction temperature. Preferably the reaction should be carried to substantial completion, the alcohol or hydrogen halide liberated being removed from the reaction mixture by an suitable means.

The products obtained by the reaction of the aralkyl halide or aralkyl ether with a molar excess of a phenolic compound according to this invention are generally low molecular weight materials which may be coloured, viscous liquids at room temperature. As with the conventional novolac resin compositions these reaction products may be converted to higher molecular weight materials by the addition thereto of a hardening agent, usually hexamethylene tetramine, and heating, normally to a temperature within the range from 100 to 200° C. The extent of the molecular weight increase and the nature of the resin obtained will depend on the quantity of hardening agent employed and the duration and temperature of the heating period. Although the reaction product may be converted to the solid, infusible, insoluble state in one step by employing relatively high proportions, for example up to 20 percent by weight, of hardening agent it is usually preferred to employ a smaller proportion of the agent to obtain a partially polymerised product. This partially polymerised product may then be stored if desired and in application can be further polymerised (or cross-linked) in the presence of additional quantities of the hardening agent and/or by subjecting it to a further heating step.

The resinous, partially polymerised (or cross-linked) product obtained on reaction of the initial reaction product with the hardening agent may be a viscous liquid or a solid. Generally, the partially polymerised product will be a solid at this stage, its physical form, depending mainly on the nature of the phenolic compound employed and on the degree of cross-linking which has taken place.

As hereinabove described the modified-novolac type reaction products of this invention may be converted to the infusible, insoluble state by reaction with, for example, hexamethylene tetramine as the hardening agent. However, although hexamethylene tetramine comprises the most preferred material for this purpose it is to be understood that the use of other known novolac resin hardening agents such as quinone, chloranil, anhydroformaldehyde-aniline and ethylene diamine-formaldehyde is also included within the scope of this invention.

The phenolic compounds may be employed alone in forming the polymers of this invention or they may be employed in the reaction in conjunction with compounds containing aromatic nuclei and not being phenolic compounds as required by this invention. The additional use of the said aromatic compounds in the reaction provides a means of modifying the properties of the product. Suitable aromatic compounds are those capable of condensation with the aralkyl halide or aralkyl ether and include for example diphenyl ether, dibenzyl ether, terphenyl, diphenylamine, diphenyl sulphide, diphenyl, anthracene, naphthalene, diphenyl sulphone, triphenyl phosphate, octaphenylcyclotetrasiloxane, aryl-substituted borazoles and metal complexes such as ferrocene. Preferably the compound containing aromatic nuclei is selected from diphenyl, terphenyl and diphenyl ether. The proportion of the compound containing aromatic nuclei which may be incorporated may vary within wide limits but should not be so large as to prevent satisfactory curing of the reaction product under the action of the particular novolac hardening agent employed.

Conveniently the compound containing aromatic nuclei is mixed with the reacting components and the reaction initiated. In some cases however, particularly where the aromatic compound is of low reactivity, it may be advantageous to partially react the compound containing aromatic nuclei with the aralkyl ether or halide prior to incorporating the phenolic compound in the reaction mixture.

When the compound containing aromatic nuclei is employed it is not then essential that the phenolic compound should itself be present in molar excess over the aralkyl halide or aralkyl ether provided that the total of the phenolic compound and the compound containing aromatic nuclei taken together represents the required molar excess. As the molar proportion of the aralkyl halide or aralkyl ether approaches that of the other reactant the reaction mixture exhibits an increased tendency to gel prematurely. Generally therefore we prefer to employ 1.3 to 3.0, and more preferably from 1½ to 2½ moles of the phenolic compound, or of the phenolic compound and the compound containing aromatic nuclei, for every mole of the aralkyl halide or aralkyl ether.

As is known for the conventional organic novolac resins the resins of this invention may be further modified by reaction with unsaturated compounds, in particular the unsaturated oils such as tung oil, linseed oil, perilla and dehydrated castor oils. Such modification may be carried out, for example, by reacting the unsaturated compound with the prepared polymerisable, modified-novolac reaction product.

The modified novolac resins of this invention are heat stable to a degree which is often superior to that of the conventional organic novolacs. They may be compounded with organic or inorganic fillers and are suitable for use in a wide variety of applications for example as binders and in the preparation of moulding compounds for use in the manufacture of abrasive grinding wheels and asbestos or fibrous glass reinforced moulded components, and in the preparation of lamp capping cements. When prepared in the form of a fine powder the resinous compositions of the invention are suitable for coating articles by fluidised bed techniques. They may be dissolved in a suitable solvent, for example methyl ethyl ketone or methyl cyclohexanone, and used for impregnating for example glasscloth, asbestos paper and asbestos fabric, which may subsequently be consolidated under heat and pressure to give laminated or moulded products. Hexamethylene tetramine is of limited solubility in most common organic solvents. When preparing resin solutions containing a relatively high proportion of this hardening agent therefore we prefer to cause partial reaction between resin and the hexamethylene tetramine and then dissolve the partial reaction product in the solvent. Further quantities of hexamethylene tetramine may be added with the solvent although these further quantities will be limited by the solubility of the hexamethylene tetramine therein.

We have also found that the resinous products of this invention are useful in the preparation of solid lubricant compositions by incorporating into the resin prior to the final cross-linking stage a solid lubricant mtaerial such as graphite or molybdenum disulphide. The quantity of solid lubricant material incorporated into the resin may vary widely but preferably falls within the range of from 1 to 25 percent by weight. Solid lubricant compositions prepared in this manner are useful, for example, as coatings for gear wheels and shafts and in the manufacture of self lubricating bearings.

The following examples illustrate the invention.

EXAMPLE 1 p-Cresol (2.0 moles, 216 g.) and p-xylene glycoldimethylether (1.0 mole, 166 g.) were mixed and heated to a temperature of 130° C. with stirring in order to remove any water from the system. Stannic chloride (0.001 mole, 0.11 ml.) was then added to the cooled mixture, which was reheated with stirring and the methanol formed allowed to distill out. The heating was continued until no further methanol was liberated the reaction then being substantially complete. The reaction product at this stage was a brown viscous liquid.

When 50 g. of this liquid were mixed with 5 g. of hexamine (hexamethylene tetramine) and heated for 40 minutes with continuous agitation at 145° C. a higher molecular weight polymeric material was obtained. This material was a hard yellowish-brown solid having a melting point of about 115° C. and which could be crushed to give a fine powder. When mixed with a further 5% by weight of hexamine and heated to 150° C. the powder was converted to a solid, intractable resin.

EXAMPLE 2 p-Cresol (1.864 moles, 202 g.), diphenyl oxide (0.800 mole, 136 g.) and p-xylyleneglycoldimethylether (1.336 moles, 222 g.) were heated together with stirring to 130° C. in order to remove any traces of moisture. Stannic chloride (0.00134 mole, 0.156 ml.) was then added and the mixture heated with stirring until the theoretical quantity of methanol had distilled out. The reaction product obtained was a dark brown viscous liquid.

A quantity of this liquid (50 g.) was mixed with 1.25 g. of hexamine and heated with stirring for 45 minutes at 170° C. to give a clear yellowish-brown liquid which solidified on cooling. This solid had a melting point of 96° C. and could be easily crushed to give a fine yellow powder.

In order to examine its thermal stability a quantity of the resin was heated at 250° C. for 250 hours. The loss in weight of the resin after this time was only 1.7 percent. A further sample of this resin prepared from 50 g. of the viscous liquid and 3.25 g. of hexamine exhibited a weight loss of 4 percent under the same conditions.

When a commercially available conventional phenolic resin was subjected to this test the weight loss was found to be 18 percent.

EXAMPLE 3 p-Tert-butylphenol (1.86 moles, 280 g.) diphenyloxide (0.80 mole, 136 g.) and p-xylyleneglycoldimethylether (1.34 moles, 221 g.) were heated in the presence of stannic chloride (0.00134 mole, 0.156 ml.) until the theoretical quantity of methanol had been liberated. The polymeric reaction product obtained was found to be a soft, pliable dark solid at room temperature.

A 25 g. sample of this resin was heated with stirring in an oil bath at 170° C. with 0.625 g. of hexamine, the cross-linking (hardening) of the resin being allowed to proceed to a stage where stirring became impossible. The product was then allowed to cool and was found to be a solid (M.P. 102° C.) which could be ground to a yellow powder suitable for incorporating in moulding compositions.

A quantity of the initial resinous reaction product (79 g.) was mixed with hexamine (1 g.) and the mixture heated for 5 minutes with stirring at 150° C. Polymerised tung oil (20 g.) was then added and the system heated for a further 30 minutes at 150° C. and then for 1 hr. at 175° C. At the end of the heating period the product was completely homogeneous. A 50% by weight solution of this product in toluene had a viscosity of 132 cs. at 25° C. The resin solution thus obtained was used for impregnating glass-cloth tape by dipping, the resin there-after being cured for 30 minutes at 150° C. A further coat of the resin was applied in a similar manner and cured for a further 1 hr. at 175° C. The coated tape was brown and more flexible than similar tapes produced with a resin which was not oil modified.

The oil-modified resin was found to cure slowly at 25° C. over a period of 3–4 days when loaded with metallic driers or combinations of metallic driers such as lead, cobalt and manganese naphthenates and exposed to the atmosphere as a thin film.

EXAMPLE 4

Octaphenylcyclotetrasiloxane (0.20 mole, 159 g.) and p-xylyleneglycoldimethyl ether (0.66 mole, 110 g.) were heated with stannic chloride (0.00134 mole, 0.156 ml.) until 25 percent by weight of the theoretical quantity of methanol had been removed. At this point p-cresol (1.13 moles, 122 g.) was added to the system and the condensation allowed to continue until the theoretical quantity of alcohol had been removed. The reaction product obtained was a brown, opaque, tacky solid.

When 25 g. of the resin was heated for 30 minutes at 170–175° C. with 0.625 g. of hexamine a hard brown opaque solid was obtained, having a melting point of 99° C.

EXAMPLE 5 p-Cresol (2.0 moles, 216 g.), diphenyloxide (0.8 mole, 136 g.) and p-xylene dichloride (1.2 moles, 210 g.) were heated with stannic chloride (0.0012 mole, 0.14 ml.) until no further hydrochloric acid was liberated. The reaction product was a dark viscous liquid. This liquid (25 g.), on heating with hexamine (0.76 g.) for 110 minutes at 170–175° C., was converted to a clear brown solid melting at 60° C.

EXAMPLE 6 p-Phenylphenol (0.20 mole, 24.0 g.), phenol (0.112 mole, 10.56 g.) and 2,3,5,6-tetrachloro-1,4-chloromethylbenzene (0.187 mole, 58.5 g.) were mixed and heated in the preence of stannic chloride (0.1 ml.) in a reaction vessel fitted with a stirrer at a temperature of 170° C. for 4 hours. After this time the reaction mixture had been converted to a dark coloured material which was a solid at room temperature.

A portion (22.0 g.) of this polymeric reaction product was then heated with hexamine (0.55 g.) for 3 hours at 150° C. to increase its molecular weight, the mixture being stirred continuously during the heating step. The product thus obtained was a dark brown solid having a melting point of 69° C. and which could be crushed to a fine powder.

When 90 parts by weight of the powdered polymeric material was mixed with 10 parts by weight of hexamine and heated for 10 minutes at 200° C. a hard, intractable resin was obtained.

When exposed to a gas flame this intractable resin burned only very slowly and reluctantly. For comparative purposes a resin was prepared by exactly the same method, except that the 2,3,5,6-tetrachloro-1,4-chloromethylbenzene was replaced by p-xylyleneglycol dimethyl ether. This comparative resin burned strongly when heated in a gas flame.

EXAMPLE 7

Phenol (0.5 mole, 47.05 g.), p-phenylphenol (0.89 mole, 151.6 g.) and p-xylene glycoldimethylether (0.83 mole, 138.5 g.) were mixed and the mixture heated for one hour at 130° C. to remove any traces of moisture that might have been present. Stannic chloride (0.38 ml.) was added to the dried mixture which was then heated with stirring until the theoretical quantity of methanol had been evolved. The reaction product obtained was a dark solid.

A quantity (100 g.) of this reaction product was mixed with hexamine (1.5 g.) and the mixture heated with stirring for 1 hour at 170° C. to give a clear brown solid. This solid was liquified by heating, molybdenum disulphide (5 g.) dispersed in the liquid and the mixture allowed to cool to a solid which was then crushed to a fine powder.

The powdered solid could be converted to the intractable, highly cross-linked state by the addition of hexamine and heating. It was found to be useful for making moulded articles, such as self lubricating bearings, with or without the additional presence of filler materials such as silicas and clays.

EXAMPLE 8

Phenol (1.06 moles, 100 g.) and p-xylylene glycoldimethylether (0.71 mole, 117.6 g.) were mixed and heated to a temperature of 130° C. with stirring in order to remove any water from the system. The mixture was cooled stannic chloride (0.0007 mole, 0.081 ml.) added, and the mixture then heated again with stirring, the methanol formed being allowed to distil out. Heating was continued until no further methanol was liberated. When cool the reaction product was obtained as a brown low melting solid.

When 30 g. of the reaction product was mixed with 0.2 g. of hexamine and the mixture heated for 25 minutes with continuous stirring at 170° C., a higher molecular weight polymeric material was obtained which could be crushed to give a fine yellow-brown powder. When mixed with a further quantity of hexamine and heated again to 170° C. the powder was converted to an intractable solid.

EXAMPLE 9

Phenol (1.17 moles, 105.4 g.), bis-phenol A, (diphenylolpropane) (0.37 mole, 85.2 g.) and p-xylylene glycoldimethylether (1.0 mole, 166.6 g.) were heated together to about 130° C. After cooling the mixture stannic chloride (0.0014 mole, 0.156 ml.) was added and the reaction mixture heated with continuous stirring until methanol ceased to distil out. The cooled reaction product was a dark brown low melting solid.

When 20 g. of this polymer was heated at 170° C. with 0.2 g. hexamine, a higher molecular weight product was formed after 15 minutes having a melting point of 78° C. When cool this product was crushed to a fine yellow brown solid which on heating with a total of 10% hexamine at 200° C. gave a hard intractable solid resin.

EXAMPLE 10

When phenol (0.127 mole, 11.9 g.), diphenylsulphone (0.04 mole, 8.7 g.) and p-xylyleneglycoldimethylether (0.1 mole, 16.6 g.) were reacted in the presence of stannic chloride (0.0001 mole, 0.02 ml.) according to the method described in Example 9 the reaction product was a dark brown, low melting solid.

This solid could be converted to a hard thermoset resin on heating with hexamine.

EXAMPLE 11

Phenol (5.62 mole, 530 g.) p-hydroxydiphenyl (1.875 mole, 318 g.) and p-xylyleneglycoldimethylether, were heated together with stannic chloride, (0.005 mole, 0.579 ml.) in the manner described in Example 9 to yield a dark brown low melting solid.

To a portion of the resin was added 10% by weight of hexamine and the mixture heated with stirring for 10 minutes at 130° C. to yield on cooling a yellow brown solid. This solid was crushed to a fine powder and dissolved in sufficient methyl ethyl ketone to give an approximately 50% by weight solution. Glass cloth was impregnated with the solution to a resin solids pick-up of about 40% total weight of glass and resin. The cloth, after precuring at 135° C. for 12 minutes was used to prepare 20 ply laminates by pressing for 30 minutes at 175° C. under a pressure of 1,000 p.s.i. The laminates were post cured by heating to 250° C. over a period of 24 hours, and then held at 250° C. for an additional 4 hours. Flexural strength measurements according to B.S. 2782 were made at 25° C. and 250° C. initially and after 24 hours and 500 hours heat ageing at 250° C.

The values obtained are shown in the following table.

| Condition | Flexural strength, p.s.i. | |
|---|---|---|
| | 25° C. | 250° C. |
| As prepared | 81,000 | 28,000 |
| After 24 hours at 250° C. | 95,000 | 49,000 |
| After 500 hours at 250° C. | 80,000 | 45,000 |

The electric strength was measured on 10 ply laminates which had been similarly prepared and was found to be greater than 800 v./mil. The laminate was tested again after a heat ageing period of 1,120 hours at 250° C. and the electric strength found to be still greater than 300 v./mil.

We claim:
1. A process for the preparation of polymers which consists essentially in reacting (1) a compound selected from the group consisting of aralkyl ethers of the general formula R′[—(CH$_2$OR]$_a$ wherein R′ is selected from the group consisting of divalent aromatic hydrocarbon radicals, divalent aromatic hydrocarbonoxy radicals, trivalent aromatic hydrocarbon radicals and trivalent aromatic hydrocarbonoxy radicals, R is an alkyl radical containing less than 6 carbon atoms, and $a$ is equal to 2 or 3, with a molar excess of (2) at least one phenol containing 1–3 hydroxy groups.

2. The process of claim 1 carried out in the presence of a Friedel-Crafts catalyst.

3. The process of claim 2 wherein from 1.3 to 3.0 moles of said phenol are employed for every mole of aralkyl ether.

4. The process of claim 3 wherein said phenol is selected from the group consisting of phenol, p-cresol, resorcinol, catechol, isopropyl catechol, diphenylolpropane, diphenylolmethane, alkyl phenols such as p-ethylphenol, p-tert-butylphenol and p-tert-octyl phenol, p-phenylphenol, m-phenylphenol, p-aminophenol, pyrogallol and phloroglucinol.

5. The process of claim 4 wherein R′ is the phenylene radical.

6. The process of claim 4 wherein the compound (1) is a p-xylyleneglycoldialkyl ether.

7. The process of claim 6 further characterized in that the product obtained by reacting (1) and (2) is mixed with a hardening catalyst for novolac resins and the resulting mixture is heated.

8. The process of claim 7 wherein the hardening catalyst is hexamethylene tetramine.

9. The process of claim 8 wherein the mixture is heated to a temperature within the range from 100 to 200° C.

10. A process for the preparation of polymers which consists essentially in reacting (1) a compound selected from the group consisting of aralkyl ethers of the general formula R′[—(CH$_2$OR]$_a$ wherein R′ is selected from the group consisting of divalent aromatic hydrocarbon radicals, divalent aromatic hydrocarbonoxy radicals, trivalent aromatic hydrocarbon radicals and trivalent aromatic hydrocarbonoxy radicals, R is an alkyl radical containing less than 6 carbon atoms, and $a$ is equal to 2 or 3, with (2) at least one phenol containing 1–3 hydroxy groups, and (3) at least one compound other than (1) and (2) containing an aromatic nuclei, the total of the amounts of (2) and (3) being in molar excess to the amount of (1).

11. The process of claim 10 wherein said phenol is selected from the group consisting of phenol, p-cresol, resorcinol, catechol, isopropyl catechol, diphenylolpropane, diphenylolmethane, alkyl phenols such as p-ethylphenol, p-tert-butylphenol and p-tert-octyl phenol, p-phenylphenol, m-phenylphenol, p-aminophenol, pyrogallol and phloroglucinol and wherein said compound (3) is selected from the group consisting of diphenyl ether, dibenzyl ether, terphenyl, diphenylamine, diphenyl sulphide, diphenyl, anthracene, naphthalene, diphenyl sulphone, triphenyl phosphate, octaphenylcyclotetrasiloxane, aryl-substituted borazoles and ferrocene.

12. The process of claim 11 carried out in the presence of a Friedel-Crafts catalyst.

13. The process of claim 12 wherein from 1.3 to 3.0 moles of the phenol compound in conjunction with said compound containing aromatic nuclei, are employed for every mole of aralkyl ether and/or aralkyl halide.

14. The process of claim 12 wherein R' is the phenylene radical.

15. The process of claim 12 wherein the compound (1) is a p-xylyleneglycoldialkyl ether.

16. The process of claim 15 further characterized in that the product obtained by reacting (1) and (2) and (3) is mixed with a hardening catalyst for novolac resins and the resulting mixture is heated.

17. The process of claim 16 wherein the hardening catalyst is hexamethylene tetramine.

18. The process of claim 17 wherein the mixture is heated to a temperature within the range from 100 to 200° C.

References Cited

UNITED STATES PATENTS

| | | | |
|---|---|---|---|
| 3,042,655 | 7/1962 | Massengale et al. | 260—51 |
| 3,047,518 | 7/1962 | Doedens et al. | 260—2.5 |
| 3,128,259 | 4/1964 | Sonnabend | 260—18 |
| 3,219,628 | 11/1965 | Doedens et al. | 260—61 |
| 3,316,140 | 4/1967 | Sonnabend | 161—198 |
| 3,316,186 | 4/1967 | Geyer et al. | 260—2.1 |
| 3,274,157 | 9/1966 | Doedens | 260—47 |
| 3,338,844 | 8/1967 | Harris et al. | 260—2 |
| 3,405,091 | 10/1968 | Sprengling et al. | 260—47 |
| 3,423,335 | 1/1969 | Phillips | 260—2 |
| 3,437,695 | 4/1969 | Kruse | 260—613 |

WILLIAM H. SHORT, Primary Examiner

H. SCHAIN, Assistant Examiner

U.S. Cl. X.R.

117—124, 126, 161; 161—198; 260—19, 32.8, 33.6, 38, 47, 611, 623

UNITED STATES PATENT OFFICE
CERTIFICATE OF CORRECTION

Patent No. 3,576,788          Dated April 27, 1971

Inventor(s) GLYN ISLWYN HARRIS and FREDERICK COXON

It is certified that error appears in the above-identified patent and that said Letters Patent are hereby corrected as shown below:

Column 1, lines 10 and 11, rewrite these lines as follows: --Claims priority, applications Great Britain, July 27, 1966, 33,831/66 and November 29, 1966, 53497/66.
Column 1, line 17, delete "or an aralkyl halide".
Column 8, line 22, between "OR" and "]" insert --)--; line 46 delete "6", and in its place insert --5--; line 57, between "OR" and "]" insert --)--.

Signed and sealed this 14th day of September 1971.

(SEAL)
Attest:

EDWARD M. FLETCHER, JR.          ROBERT GOTTSCHALK
Attesting Officer                Acting Commissioner of Patent